A. M. GOW.
DUMP CAR CONTROL MECHANISM.
APPLICATION FILED MAR. 2, 1918.
1,283,735.
Patented Nov. 5, 1918.
2 SHEETS—SHEET 1.
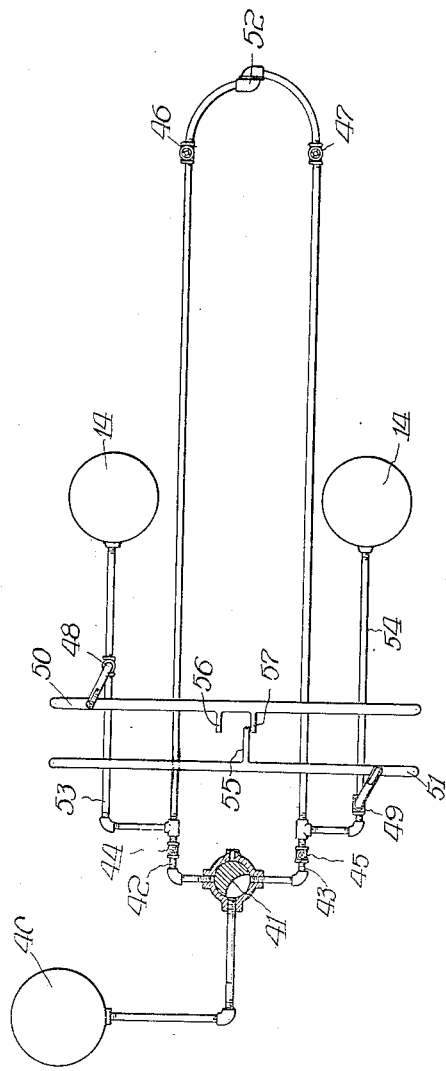

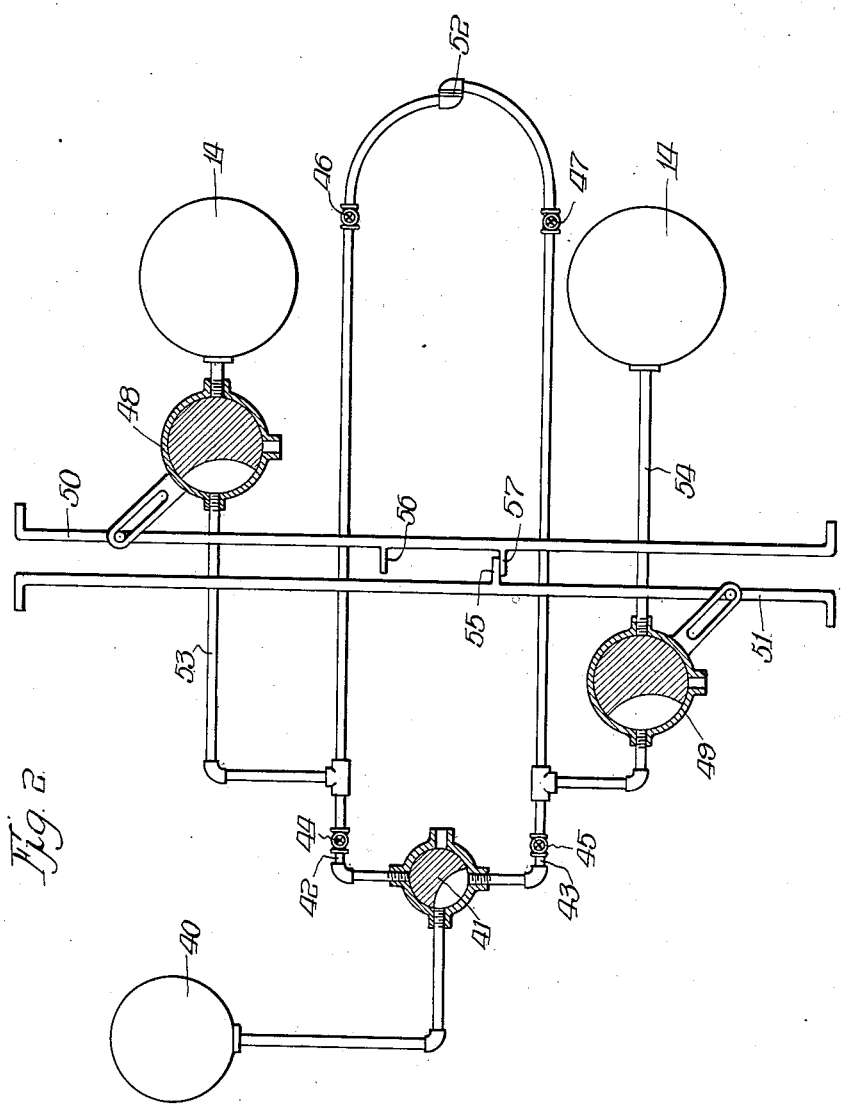

UNITED STATES PATENT OFFICE.

ALEXANDER M. GOW, OF DULUTH, MINNESOTA.

DUMP-CAR CONTROL MECHANISM.

1,283,735.

Specification of Letters Patent.

Patented Nov. 5, 1918.

Application filed March 2, 1918. Serial No. 219,977.

*To all whom it may concern:*

Be it known that I, ALEXANDER M. GOW, a citizen of the United States, and resident of Duluth, in the county of St. Louis and State of Minnesota, have invented certain new and useful Improvements in Dump-Car Control Mechanism, of which the following is a specification.

This invention relates to dump car control mechanism.

One of the objects of this invention is to make the control of dump cars more foolproof in connection with the dumping and righting action thereof.

Another object of the invention is to provide a control arrangement for dump cars adapted to meet the various requirements for successful commercial usage.

Generally speaking these and other objects are accomplished by providing in dump car control mechanism, the combination of means whereby the car may be tilted in different directions, and means whereby the tilting means is controlled to cause a tilting force to be effective in one direction only at a time.

The invention is illustrated on the accompanying sheet of drawings in which Figure 1 shows diagrammatically the air piping and the control mechanism; and Fig. 2 shows the same arrangement with parts in section for the sake of clearness.

In my Patents Nos. 1,248,312 granted November 27, 1917, and 1,251,770, granted January 1, 1918, of which this present invention is an improvement, I have disclosed an arrangement whereby a dump car may be dumped to either side and righted by mechnism operated by air pressure. This arrangement includes a reservoir 40, preferably mounted on a locomotive and containing compressed air, furnished by an air pump, in the usual manner. A four-way valve 41 is adapted to give air to either pipe line 42 or 43, furnishing air to the dumping cylinders 14. The usual cut-out cocks 44, 45, 46 and 47 are installed on these lines. By means of the hose coupling 52, air lines 42 and 43 may be coupled together on the last car of the train. From line 42 is taken the branch line 53, leading to the air cylinder on that side of the car and from line 43 is taken the branch line 54, leading to the air cylinder on its side of the car. Branch line 53 is controlled by valve or dump cock 48, operated by a rod 50 and branch line 54 is controlled by a valve or dump cock 49, operated by a rod 51. Rods 50 and 51 extend transversely across the car and can be operated from either side. Suppose it is desired that the entire train be dumped and righted from the engine: Dump cocks 48 and 49 are set to the open position in a counter clockwise movement, as shown in the diagram, by pushing the left rod and pulling the right hand rod on either side of the car. Cut-out cocks 44 and 45 are set to open position on each car while cocks 46 and 47 remain closed. Valve 41 on the engine is set to the closed position. To dump, the engineer throws air on either line 42 or 43 and the car is dumped to the opposite side. He then throws air on the other line and the car is righted. Suppose it is desired to operate the cars one at a time, independently of the engineer. Cut-out cocks 46 and 47 are opened and valve 41 on the engine is set in the position shown. Both air lines 42 and 43 are now under pressure. Dump cocks 48 and 49 are closed. Now push the left hand rod and the car dumps from the operator. Pull the right hand rod and the car rights toward the operator.

Suppose it is desired to "spot" and dump several cars at one place and then move the train and dump the remainder at the same place. To avoid the danger from leaking of cocks 48 and 49, it is preferable that in transit the air lines 42 and 43 be not under pressure. Consequently valve 41 is closed. Cut-out cocks 46 and 47 on the last car are closed. When the cars are "spotted" push the left hand rods on the cars to be dumped. Signal the engineer to throw air on the line on the side where the operator is. Should he make a mistake no harm is done, for the other dumping cocks are closed. The cars are dumped. Now pull the right hand rods and signal the engineer to throw air on the other line and the cars are righted.

It will be understood that these cars are operated at night, in bad weather and by men of very ordinary intelligence. In addition it is a very serious matter to dump a car the wrong way, and a safety arrangement of the operating rods is necessary for successful operation of the trains. This arrangement gives the desired flexibility of operation, makes both sides of the car alike, and it can be explained to a man that if he pushes the left hand rod, the car will go from him and if he pulls the right hand rod the car will come toward him.

However, it has been found that the mechanism must be made even more fool-proof because workmen are apt to push one rod and pull the other at the same time, causing results which may prove disastrous. To make more fool-proof such a control arrangement, I have provided means whereby it is impossible to have a dumping action effective on more than one side at a time, or in other words, I have provided an arrangement whereby the tilting means is controlled to cause a tilting force to be effective in one direction only at a time. This means includes three members 55, 56 and 57, the first member being mounted upon operating rod 51 and the other two members being mounted upon rod 50 to form an interconnection between said rods. It will be noted that the member 55 extends between the members 56 and 57 and is of sufficient length to lie within the path of movement of said members.

In operation, let it be assumed that it is desired to dump the car in one direction. The left hand control rod 51 is pushed, whereby the valve 49 is opened to supply air to one of the cylinders 14. During this movement of the control rod 51, the member 55 passes out of engagement with member 57 and into engagement with member 56. Under these conditions, if the operator should, at the same time, pull on the right hand control rod 50, not only would the control valve 48 be opened, but also the control valve 49 would be moved back into closed position so that the cylinders could not act in opposition to each other to damage the car. The dumping action in the other direction is controlled in a similar manner, it being understood that if the control rod 50 is pushed from the other side of the car, dumping action will take place and under these conditions, if the member 55 of the other rod 51 is in contact with member 56, it with its operating rod 51, will be forced to a position to close the valve 49, so that the cylinders will not oppose each other.

By means of this arrangement the tilting force either for dumping or righting, can be effective only in one direction at a time, thereby making the control mechanism more fool-proof.

It is my intention to cover all modifications falling within the spirit and scope of the following claims.

I claim:

1. In dump car control mechanism, the combination of means whereby the car may be tilted in different directions, and two operatively connected control members whereby the tilting means is controlled to cause the tilting force to be effective in one direction only at a time.

2. In dump car control mechanism, the combination of means whereby the car may be tilted in opposite directions, and two operatively connected control means whereby the tilting means is controlled to cause the tilting force to be effective in one direction only at a time.

3. In dump car control mechanism, the combination of means whereby the car may be dumped in different directions and two operatively connected control means whereby the dumping means is controlled to cause the dumping force to be effective in one direction only at a time.

4. In dump car control mechanism, the combination of means whereby the car may be righted in different directions, and two operatively connected control members whereby the righting means is controlled to cause the righting force to be effective in one direction only at a time.

5. In dump car control mechanism, the combination of a plurality of control valves, interconnected control members for selectively opening said valves for actuating the car in a predetermined manner and whereby only one of said valves may be open at a time.

6. In dump car control mechanism, the combination of a plurality of control valves, interconnected control members for selectively opening said valves for actuating the car in the predetermined manner and whereby when one of the valves is opened and another valve is given an opening movement the first valve will be given a closing movement.

7. In dump car control mechanism, the combination of a plurality of control valves, and members operatively connected to said valves and being operative from different sides of the car, said members being operatively connected to each other whereby only one valve may be given an opening movement at a time.

8. In dump car control mechanism, the combination of a plurality of control valves, control members operatively connected thereto, and interlocking means for said control members whereby conflicting dumping actions may not occur.

9. In dump car control mechanism, the combination of a plurality of operating cylinders for dumping the car, control valves for said cylinders, operating members operatively connected to said control valves, and means associated with said operating members whereby only one of said cylinders may be effective at a time.

Signed at Duluth, Minnesota, this 25th day of February, A. D. 1918.

ALEXANDER M. GOW.

Witnesses:
 D. B. CLARK,
 OTTO S. MAUTHEY.